US012569984B2

(12) United States Patent
Hafner

(10) Patent No.: US 12,569,984 B2
(45) Date of Patent: Mar. 10, 2026

(54) SYSTEM AND METHODS FOR PIXEL BASED MODEL PREDICTIVE CONTROL

(71) Applicant: GOOGLE LLC, Mountain View, CA (US)

(72) Inventor: Danijar Hafner, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/436,684

(22) Filed: Feb. 8, 2024

(65) Prior Publication Data

US 2024/0173854 A1     May 30, 2024

Related U.S. Application Data

(63) Continuation of application No. 17/056,104, filed as application No. PCT/US2019/032823 on May 17, 2019, now Pat. No. 11,904,467.

(60) Provisional application No. 62/673,744, filed on May 18, 2018.

(51) Int. Cl.
*B25J 9/16* (2006.01)
*G06N 7/01* (2023.01)

(52) U.S. Cl.
CPC .............. *B25J 9/161* (2013.01); *B25J 9/163* (2013.01); *B25J 9/1661* (2013.01); *G06N 7/01* (2023.01)

(58) Field of Classification Search
CPC .......... B25J 9/161; B25J 9/163; B25J 9/1661; G06N 7/01; G05B 2219/39271; G05B 2219/39286; G05B 13/048
USPC ....................................................... 700/245
See application file for complete search history.

(56) References Cited

U.S. PATENT DOCUMENTS

| | | | |
|---|---|---|---|
| 9,070,083 B2 | 6/2015 | Suh | |
| 10,603,797 B2 * | 3/2020 | Ozaki | B25J 13/085 |
| 10,766,136 B1 | 9/2020 | Porter | |
| 10,800,040 B1 | 10/2020 | Beckman et al. | |
| 2015/0100530 A1 * | 4/2015 | Mnih | G06N 3/08 706/25 |
| 2017/0334066 A1 | 11/2017 | Levine et al. | |
| 2018/0089553 A1 | 3/2018 | Liu | |
| 2018/0099408 A1 * | 4/2018 | Shibata | B25J 9/1697 |
| 2019/0143541 A1 | 5/2019 | Nemallan | |

(Continued)

FOREIGN PATENT DOCUMENTS

| | | |
|---|---|---|
| CN | 103810500 | 5/2014 |
| CN | 106448670 | 2/2017 |

(Continued)

OTHER PUBLICATIONS

China National Intellectual Property Administration; Notice of Allowance issued in Application No. 201980033351.3; 5 pages; dated Nov. 1, 2023.

(Continued)

*Primary Examiner* — Kira Nguyen
(74) *Attorney, Agent, or Firm* — Gray Ice Higdon

(57) ABSTRACT

Techniques are disclosed that enable model predictive control of a robot based on a latent dynamics model and a reward function. In many implementations, the latent space can be divided into a deterministic portion and stochastic portion, allowing the model to be utilized in generating more likely robot trajectories. Additional or alternative implementations include many reward functions, where each reward function corresponds to a different robot task.

16 Claims, 10 Drawing Sheets

(56)                    References Cited

U.S. PATENT DOCUMENTS

| 2021/0078168 A1 | 3/2021 | Mehnert |
| 2021/0205984 A1 | 7/2021 | Hafner |

FOREIGN PATENT DOCUMENTS

| WO | 2017201023 | 11/2017 |
| WO | 2017223192 | 12/2017 |
| WO | 2019222597 | 11/2019 |

OTHER PUBLICATIONS

European Patent Office; Examination Report issued in Application No. 19728281.7; 6 pages; dated Jan. 4, 2023.
China National Intellectual Property Administration; First Office Action issued in Application No. 201980033351.3; 36 pages; dated Feb. 9, 2023.
European Patent Office; International Search Report and Written Opinion of PCT Ser. No. PCT/US2019/032823; 22 pages; dated Sep. 3, 2019.
Wahlstrom, N. et al. "From Pixels to Torques: Policy Learning with Deep Dynamical Models"; arxiv.org; retrieved from internet: URL:https://arxiv.org/pdf/1502.02251.pdf [retrieved Aug. 26, 2019]; 9 pages; Jun. 18, 2015.
Hafner, D. et al. "Learning Latent Dynamics for Planning for Pixels"; retrieved from internet: URL:https://arxiv.org/pdf/1811.04551v4.pdf [retrieved on Aug. 26, 2019]; 20 pages; May 15, 2019.
Argall, B. et al. "A Survey of Robot Learning from Demonstration"; Robotics and Autonomous Systems, Elsevier BV, vol. 57, No. 5, pp. 469-483; May 31, 2009.
European Patent Office; Summons issued in Application No. 19728281.7; 11 pages; dated Dec. 19, 2025.

* cited by examiner

300

SYSTEM AND METHODS FOR PIXEL BASED MODEL PREDICTIVE CONTROL

BACKGROUND

A robot (sometimes referred to as an "agent") may be able to perform a variety of tasks such as gripping an object with an end effector of the robot, planning a path for the robot to traverse in an environment, and traversing the planned path in the environment. To successfully perform a particular task in the environment, the robot may need to determine its current state in the environment by making an observation. A camera may be mounted to the robot or mounted somewhere in the environment to capture a current pose of the robot at a first time instance. Further, the robot may detect current positions of each joint of the robot from various sensors at the first instance in time. For example, if the robot were to begin performing the particular task, then the robot may be able to predict a future pose of the robot and future positions of each joint of the robot at a second time instance based on the pose and positions of each joint at the first time instance.

Various machine learning based techniques have been proposed to enable robots to perform various new tasks. For example, some techniques enable a user to model the robot and its environment in a simulated model and learn a new task within the simulated model by utilizing simulated training examples. A simple state-space model (SSM) may be provided to enable training within the simulated model. The simple SSM may consist of three components: an encoder, a transition function, and a decoder. The encoder may analyzes previous states and a current state of the robot, the transition function may compute future states of the robot, and the decoder may generate a model to predict a future trajectory of the robot based on these previous, current, and future states. These components may be arranged in various configurations to generate different models. For example, an image captured by the camera may be input to the encoder, the transition function may be applied multiple times, and the decoder may generate a model that predicts the state and trajectory of the robot for multiple future time instances.

However, these and/or other approaches can have one or more drawbacks. For example, in some situations the robot may perform some tasks incorrectly and/or be unable to perform some tasks. These situations may be due to a variety of factors such as lack of accuracy and/or robustness of model(s) utilized by the robot in performing tasks, varied and/or dynamic environments in which the robot operates, etc. As another example, the predicted state and trajectory of the robot can quickly diverge from the actual state and trajectory of the robot due to the prediction being for multiple future time instances rather than for a single future time instance.

SUMMARY

This specification is directed generally to machine learning methods and apparatus related to predicting actions for a robot from pixels of an image to perform a task. More particularly, implementations are directed to training a latent robot dynamics model (e.g., a deep neural network model such as a recurrent neural network (RNN), a convolutional neural network (CNN), and/or additional neural network model type(s)) that, once trained, is used in performance of completing one or more robotic tasks. Those implementations train the latent robot dynamics model using training examples that are based on data, where the data includes a data set of unsupervised trajectories having both partial observations and actions, and where the partial observations are from pixels of an image. The training examples are utilized to predict an encoder, a latent transition function, and a decoder for the latent robot dynamics model. The encoder may analyze previous states and a current state of the robot, the latent transition function may compute future states of the robot, and the decoder may generate a model to predict a future trajectory of the robot based on these previous, current, and future states. In some of those implementations, the data may be simulated data, where the training examples are simulated training examples, where the training examples are based on simulated observations and simulated actions. In some of those implementations, the data may be real data, where the training examples are based on real observations and actions.

In some implementations, after the latent robot dynamics model is trained, a reward function may be trained for each robotic task that the robot may perform. The reward function is generally a function of the environment state. Those implementations train the reward function using training examples that are based on data, where the data includes a data set of tasks having partial observations, actions, and rewards, and where the partial observations are from pixels of an image. By combining the trained latent robot dynamics model and the trained reward function for a particular robotic task, the robot may plan, in latent space, for the best actions to complete the particular robotic task. In some of those implementations, the data may be simulated data, where the training examples are simulated training examples, where the training examples are based on simulated observations, simulated actions, and simulated rewards. In some of those implementations, the data may be real data, where the training examples are based on real observations, actions, and rewards.

In many implementations, few-shot learning can enable a robot to learn a new task with a single and/or very few demonstrations of the task. In some implementations, model predictive control (MPC) can utilize a reward function trained for a task to learn a task. In some of those implementations, using MPC can enable the robot to few-shot learn the task. In a variety of implementations, action sequences can be evaluated faster in the compact latent space of the latent space model compared to making predictions in the image space. Fast evaluations of large batches of action sequences can be evaluated in the latent space without generating corresponding images in the image space.

The above description is provided as an overview of some implementations disclosed herein. Additional description of these and other implementations is set forth in more detail herein.

DETAILED DESCRIPTION

Various implementations are disclosed herein that are related to controlling a robot to perform a task by implementing a sequence of action determined using a robot latent dynamics model and a reward function. Robots can be programmed to perform a variety of tasks. As one example, a legged robot (e.g., multiped robots with two or more legs) can be perform tasks including walking forward, walking backwards, walking on a variety of surfaces, running, jumping, and/or additional robotic tasks. As another example, a robotic arm can perform tasks including recognizing certain objects, particular manipulation(s) of those certain objects, and/or additional tasks. In a variety of implementations, a robot can perform a desired task by implementing a sequence of actions. In many implementations, the sequence of actions can be determined using a robot latent dynamics model and a reward function for the corresponding robot task.

Figure 1:
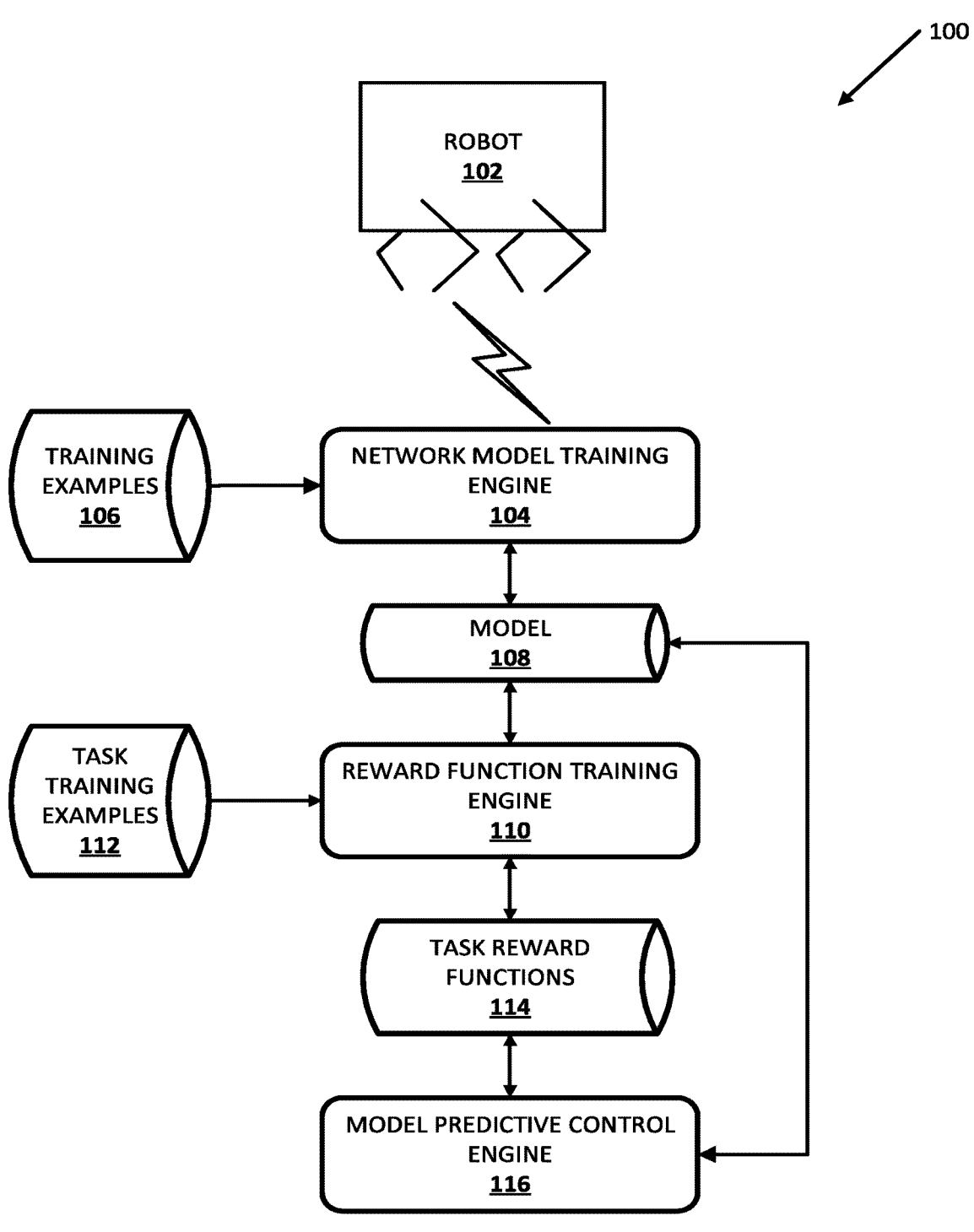
FIG. 1 illustrates an example environment where various implementations disclosed herein can be implemented.

Turning to the figures, FIG. 1 illustrates an example environment 100 in which implementations described herein may be implemented. FIG. 1 includes an example robot 102, a network model training engine 104, a reward function training engine 110, and a model predictive control engine 116. Also included are training examples 106, latent dynamics model 108, and task training examples 112.

Robot 102 is a legged robot having multiple degrees of freedom to enable robotic locomotion by controlling actuator(s) of the legs of the robot 102. For example, robot 102 can be a quadruped robot (i.e., four legged robot), where each leg is controlled by two actuators that allow the leg to move in the sagittal plane. For instance, a first actuator of a corresponding leg can be at an attachment point between the leg and a body of the robot 102, and a second actuator of the corresponding leg can be between the attachment point and a distal end of the corresponding leg (e.g., at a "knee" of the leg). The motors can be actuated through model predictive control. Other quantities of motors and/or other motor control methodologies besides model predictive control can be utilized in some implementations. Although a particular robot 102 is illustrated in FIG. 1, additional and/or alternative robots may be utilized including robots having more legs (e.g., a five legged robot, a six legged robot, an eight legged robot, and/or a robot with additional legs), robots having fewer legs (e.g., a three legged robot, a two legged robot), robots having robot arms, robots having a humanoid form, robots having an animal form, robots that include one or more wheels in addition to robot legs, and so forth.

Network model training engine 104 can be utilized to train latent dynamics model 108 based on training examples 106. Training examples 106 can include sequences of images (e.g., videos) of a robot performing a task. In many implementations, the robot can perform an unidentified task, leading to unsupervised training examples 106. Additionally or alternatively, an individual image in a sequence typically only provides partially observable data about the robot. For example, the an image can indicate the position of the robot (e.g., such as the position of each legs of the robot, the base of the robot), the position of objects in the environment with the robot, etc., but the image does not indicate velocities of the robot (e.g., does not indicate the velocity of an individual leg of the robot, does not indicate the velocity of the base of the robot, etc.). In a variety of implementations, training examples 106 can be pixel based.

In many implementations, network model training engine 104 can train latent dynamics mode 108 using unsupervised learning. Training model 108 is described below with respect to FIG. 5. In a variety of implementations, one or more aspects of network model training engine 104 can be performed locally at robot 102. In other implementations, aspect(s) of network model training engine 104 can be performed at a computing system remote from robot 102 and, model 108 can be supplied to robot 100 after training.

Reward function training engine 110 can be utilized in training reward function(s) 114 based on task training examples 112. Training reward function(s) 114 in accordance with implementations described herein is described below with respect to FIG. 6. In many implementations, task reward functions 116 can include a distinct reward function for each corresponding robot task. For example, a first reward function can correspond to the task of walking forward, a second reward function can correspond to the task of walking backwards, and a third reward function can correspond to the task of jumping. In a variety of implementations, using a trained latent space model 108 can enable training a multi-task robot using few shot learning. For example, reward function training engine 110 can train robot 102 to perform a new task of jumping, where jumping is not included in any of training example 106 used in training model 108. In many implementations, the reward function for the new task can be trained with a number of task training examples 112 less than a number of training examples 106 utilized in training model 108. Additionally or alternatively, the number of task training examples 112 can be less than 50%, 25%, 10%, 5%, or 1% of the number of training examples 106. Furthermore, the number of task training examples 112 can be less than 100 task training examples, less than 50 task training examples, less than 25 task training examples, and/or less than alternative numbers of training examples.

Model predictive control engine 116 can be utilized to generate a sequence of actions for a robot using latent dynamics model 108 and task reward functions 114. For example, model predictive control engine 116 can utilize model 108 in predicting the dynamics of the robot at time step N. These predicted dynamics can be utilized to generate one or more control signals, such as commands to actuate one or more motors of the robot, to change the position of the robot at time step N.

Figure 2A:
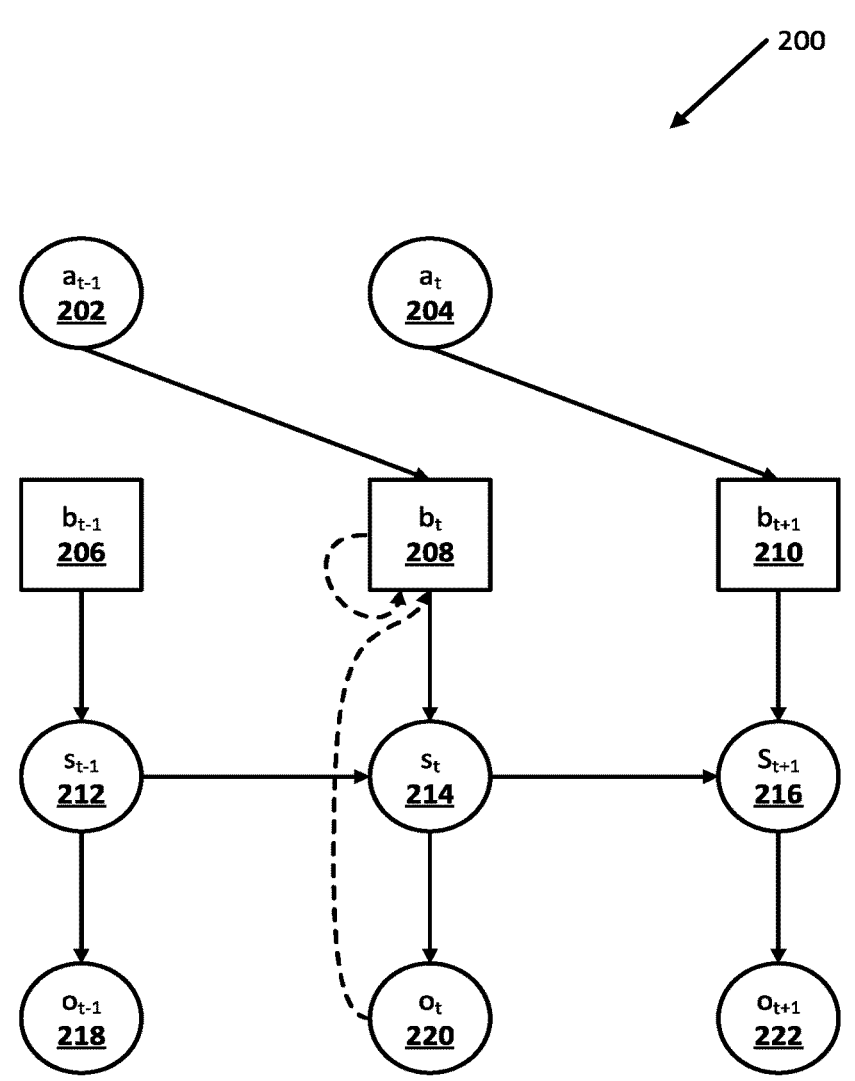
FIG. 2A illustrates an example latent dynamics model in accordance with various implementations disclosed herein.

FIG. 2A illustrates a latent dynamics model 200 in accordance with many implementations. For example, latent dynamics model 200 can include a deterministic belief state model representing a sequence of marginal beliefs over states as a deterministic activation belief vector $b_t$ that is deterministically updated by an encoder at every time step. In many implementations, weights can be shared between the prior belief $b_t$ and the posterior belief $b_t'$. In many implementations, a decoder can be implemented as updating the belief vector in-place.

In the illustrated depiction of the model 200, circles represent stochastic variables, squares represent deterministic variables, solid lines represent a generative process, and dashed lines represent an inference process. The latent dynamics model includes actions $a_{t-1}$ 102, $a_t$ 104, beliefs $b_{t-1}$ 106, $b_t$ 108, $b_{t+1}$ 110, states $s_{t-1}$ 112, $s_t$ 114, $s_{t+1}$ 116, and observations $o_{t-1}$ 118, $o_t$ 120, $o_{t+1}$ 122, where t indicates a current time step, t−1 indicates a previous time step, and t+1 indicates a future time step. In many implementations, actions 102, 104, states 112, 114, 116, and observations 118, 120, 122 are stochastic variables. Additionally or alternatively, beliefs 106, 108, 110 are deterministic variables. Splitting the model into deterministic and stochastic parts allows the model to generate more likely robotic trajectories even if an outlier is sampled for the stochastic part. In a variety of implementations, the latent dynamics model can be governed by the following equations:

$$\text{Encoder: } b_t'=e(b_t,o_t)$$

$$\text{Transition: } b_t=f(b_{t-1},a_{t-1})$$

$$\text{Posterior: } s_t \sim q(s_t|s_{t-1},b_t)$$

$$\text{Decoder: } o_t \sim p(o_t|s_t)$$

This model can be utilized to aggregate information over time in a deterministic belief vector $b_t$ to represent a diverse distribution over states at every time step. Consistent state sequences $s_{1:t} \sim \Pi_t \, q(s_t|b_t, s_{t-1})$ can be sampled by conditioning on previous states and the belief sequence. The state sequences can be sampled autoregressively to realize a coherent state sequence from the belief over multiple state sequences that the model can encode in $b_{1:T}$. In a variety of implementations, the posterior on $s_t$ deterministically depends on the whole history via $b_t$ with sampling only at a single time step.

In a variety of implementation, model 200 can predict the belief sequence $b_{1:T}$ forward in time deterministically. The belief sequence guides the subsequent sample of posterior states $s_{1:T} \sim \Pi_t \, q \, (s_t|s_{t-1}, b_t)$ to stay on the manifold of latent states. The state sequences are sampled autoregressively to realize a coherent state sequence from the belief over multiple state sequences that the model can encode in $b_{1:T}$. Since the posterior on $s_t$ deterministically depends on the whole history via $b_t$, it involves only one sample step.

In many implementations, the deterministic belief state model involves unknown latent variables, and therefore cannot directly maximize the data likelihood with respect to the model parameters. Instead, an approximate posterior distribution $q(o_{1:T}, a_{1:T})=\Pi_t \, q(s_t|o_{\leq t}, a_{<t})$ can be utilized a Helmholtz free energy bound on the observation log likelihood (ELOB). This objective can be optimized using gradient descent by reparametrizing the posterior samples.

$$\ln \ln p(o_{1:T}) \leq \Sigma_t E_{q(s_t|o_{\leq t},a_{<t})}[\ln \ln p(o_t|s_t)]-D_{KL}[q(s_t|o_{\leq t},a_{<t})\|p(s_t|o_{<t},a_{<t})]$$

This objective for latent sequence models places log-likelihood losses on the observations every time step, and the Kullback-Leibler divergence ("KL-divergence") regularizes over state posteriors and their corresponding temporal priors. In many implementations, the KL-divergence can prevent the posterior beliefs over states from collapsing to the single most likely state. The limitation of this objective is that it trains the transition function only via the KL-divergence terms between the posterior and the 1-step prior.

Figure 2B:
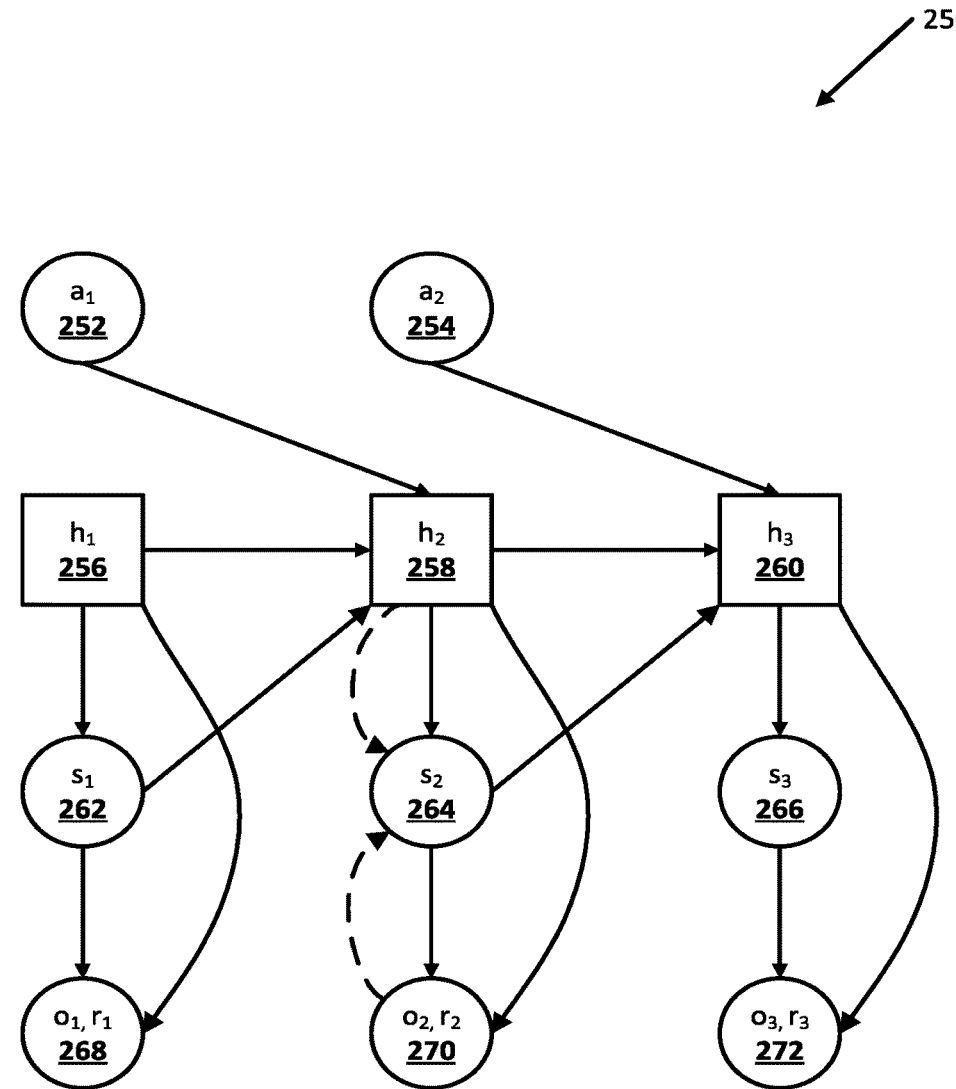
FIG. 2B illustrates another example latent dynamics model in accordance with various implementations disclosed herein.

FIG. 2B illustrates another latent dynamics model 250 in accordance with many implementations. Purely stochastic transitions can make it difficult for a transition model to reliably remember information for multiple time steps. In a variety of implementations, a deterministic sequence of activation vectors $\{h_t\}_{t=1}^{T}$ can allow the state space model to access not just the last state, but all previous states deterministically. Model 250 illustrates the first two time steps and predicts the third time step. Circles represent stochastic variables, squares represent deterministic variables, solid lines denote generative processes, and dashed lines denote the inference process. In many implementations, the state can be split into stochastic and deterministic parts, thus allowing model 250 to learn to predict multiple frames. The latent dynamics model can include actions $a_1$ 252 and $a_2$ 254, action vectors $h_1$ 256, $h_2$ 258, and $h_3$ 260, states $s_1$ 262, $s_2$ 264, and $s_3$ 266, and observations/rewards $o_1$, $r_1$ 268, $o_2$, $r_2$ 270 and $o_3$, $r_3$ 272.

In a variety of implementations, model 250 is a recurrent neural network. This model splits the state into a stochastic part $s_t$ and a deterministic part $h_t$, which depends on the stochastic and deterministic parts at the previous time step through the recurrent neural network. In a variety of implementations, model 250 can be represented by:

$$\text{deterministic state model: } h_t=f(h_{t-1},s_{t-1},a_{t-1})$$

$$\text{stochastic state model: } s_t \sim p(s_t|h_t)$$

$$\text{observation model: } o_t \sim p(o_t|h_t,s_t)$$

$$\text{reward model: } r_t \sim p(r_t|h_t,s_t)$$

where f $(h_{t-1}, s_{t-1}, a_{t-1})$ is implemented as the recurrent neural network. In many implementations, the system can utilize an encoder $q(s_{1:T}|o_{1:T}, a_{1:T})=\Pi_{t=1}^{T} \, q(s_t|h_t, o_t)$ to parameterize the approximate state posteriors. Additionally or alternatively, all information about the observations must pass through the sampling step of the encoder to avoid a deterministic shortcut from inputs to reconstructions.

In a variety of implementations, a latent dynamics model can model the environment dynamics from experience to solve unknown environments via planning. Latent dynamics models in accordance with many implementations can do so by iteratively collecting data using planning, and training the dynamics model on the gathered data. The latent dynamics model can learn a transition function (and/or a transition model), an observation model, and a reward function (and/or a reward model) from previously experienced episodes. The observation model can provide a rich training signal, but this rich training signal typically is not used for planning. Additionally or alternatively, the encoder can be learned to infer an approximate belief over the current hidden state from the previous history using filtering. In a variety of implementations, the model can be implemented as a planning process that searches for the best sequence of future actions. Model-predictive control can be utilized to allow the robot to adapt its plan based on new observations (i.e., the robot replans at each step).

The cross entropy method can be used to search for the best action sequence under the model, which is robust and can solve all considered tasks when given the true dynamics for planning. Cross entropy method can be a population-based optimization process that infers a distribution over action sequences that maximize the objective. A candidate action sequence can be evaluated under the learned model by sampling a state trajectory starting from the current state belief, and the mean rewards predicted along the sequence can be summed. When a population-based optimizer is utilized, it can be sufficient to consider a single trajectory per action sequence, thus focusing the computation on evaluating a larger number of different sequences. The planner can operate purley in the latent space because the reward is modeled as a function of the latent state. Operating purely in the latent space without generating images can allow for fast evaluation of large batches of action sequences.

Figure 3:
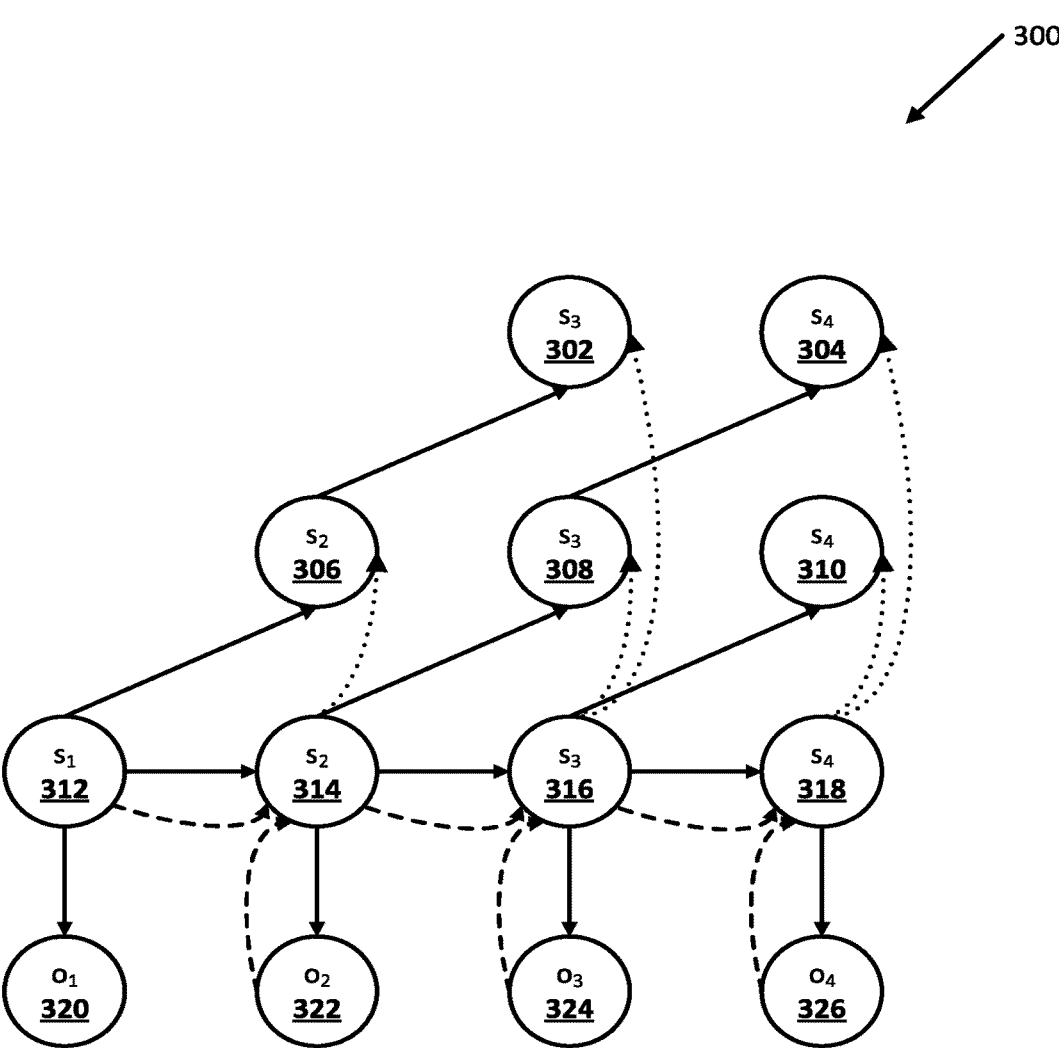
FIG. 3 illustrates an example of a latent overshooting unrolling scheme in accordance with various implementations disclosed herein.

FIG. 3 illustrates a latent overshooting unrolling scheme 300 in accordance with many implementations. Latent overshooting is a latent-space consistency regularizer that encourages open-loop states and closed-loop states to be similar. As illustrated in FIG. 3, observed data points indicate log-likelihood loss terms and dotted lines indicate KL-divergence loss terms. Latent overshooting performs open-loop unrolls from the posterior at every time step. These states are trained towards their corresponding posterior states to encourage long-horizon predictions.

FIG. 3 includes observations $o_1$ 320, $o_2$ 322, $o_3$ 324, and $o_4$ 324 and corresponding states $s_1$ 312, $s_2$ 314, $s_3$ 316, and $s_4$ 318. Latent overshooting unrolling is further illustrated. For example, $s_2$ 314 is unrolled as $s_2$ 306, $s_3$ 316 is unrolled as $s_3$ 308 and $s_3$ 302, and $s_4$ 318 is unrolled as $s_4$ 310, and $s_4$ 304.

Latent overshooting performs a fixed number of open-loop predictions from every posterior state, which can allow additional KL-divergence regularizers to be placed between the open-loop states and their corresponding closed-loop posteriors.

$$L^{LO} = \Sigma_t \Sigma_{t' < t} D_{KL}[\perp(q(o_{<t}, a_{<t})) \| p(o_{<t'}, a_{<t'})]$$

In many implementations, the transition function of the model can be trained to make accurate multi-state predictions. The gradient can be cut around the posterior states, indicated by the $\perp$ (•) function, so that the open-loop states are pushed towards the posteriors but the posteriors do not move towards the possibly inaccurate open-loop state predictions.

In many implementations, an encoder network can compute the posterior belief over states after observing the history of the current image $o_t$. The transition function can be utilized to compute the prior belief over next states from the previous state and action. This is a prior belief because it has not yet seen the new observation $o_t$. The encoder network, transition function, and decoder network can be combined in different ways.

Figure 4A:
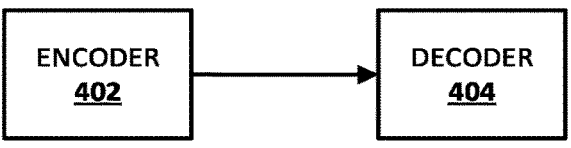
FIG. 4A illustrates an example of utilizing an encoder and a decoder in accordance with various implementations disclosed herein.

For example, as illustrated in FIG. 4A, encoder 402 can be utilized to process an input image followed by a decoder 404 to generate a reconstruction of that input image. In many implementations, an encoder followed by a decoder is a 0-step prediction. Additionally or alternatively, the encoder followed by a transition function and by the decoder can be applied to make a prediction about the image at the next step.

Figure 4B:
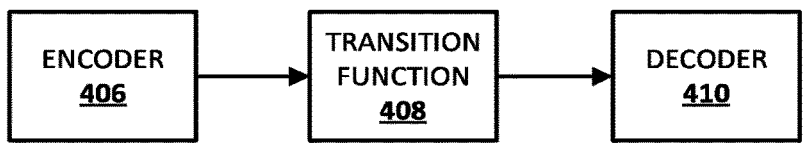
FIG. 4B illustrates an example of utilizing an encoder, a decoder, and a transition function in accordance with various implementations disclosed herein.

As illustrated in FIG. 4B, an encoder 406 followed by transition function 408 and decoder 410 can be applied to an input image to make a prediction about the image at the next time step. Making a prediction about the next time step is referred to as a 1-step prediction. Additionally or alternatively, performing 1-step predictions at every time step are referred to as closed-loop prediction.

Figure 4C:
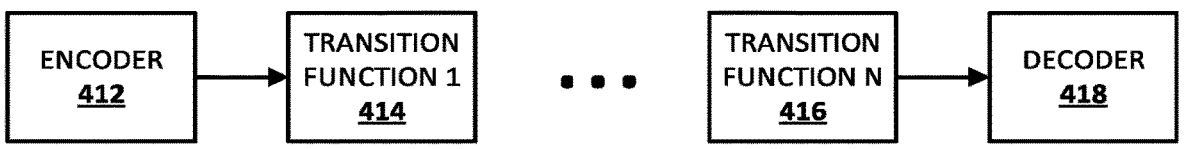
FIG. 4C illustrates an example of utilizing an encoder, a decoder, and multiple transition functions in accordance with various implementations disclosed herein.

As illustrated in FIG. 4C, an encoder can be followed by multiple instances of a transition function before being followed by a decoder. For example, encoder 412 can be followed by transition function 1 414, transition function N 416, and decoder 418 to make a prediction about the image at the Nth step. In many implementations, this N-step prediction is also referred to as open-loop prediction.

Figure 5:
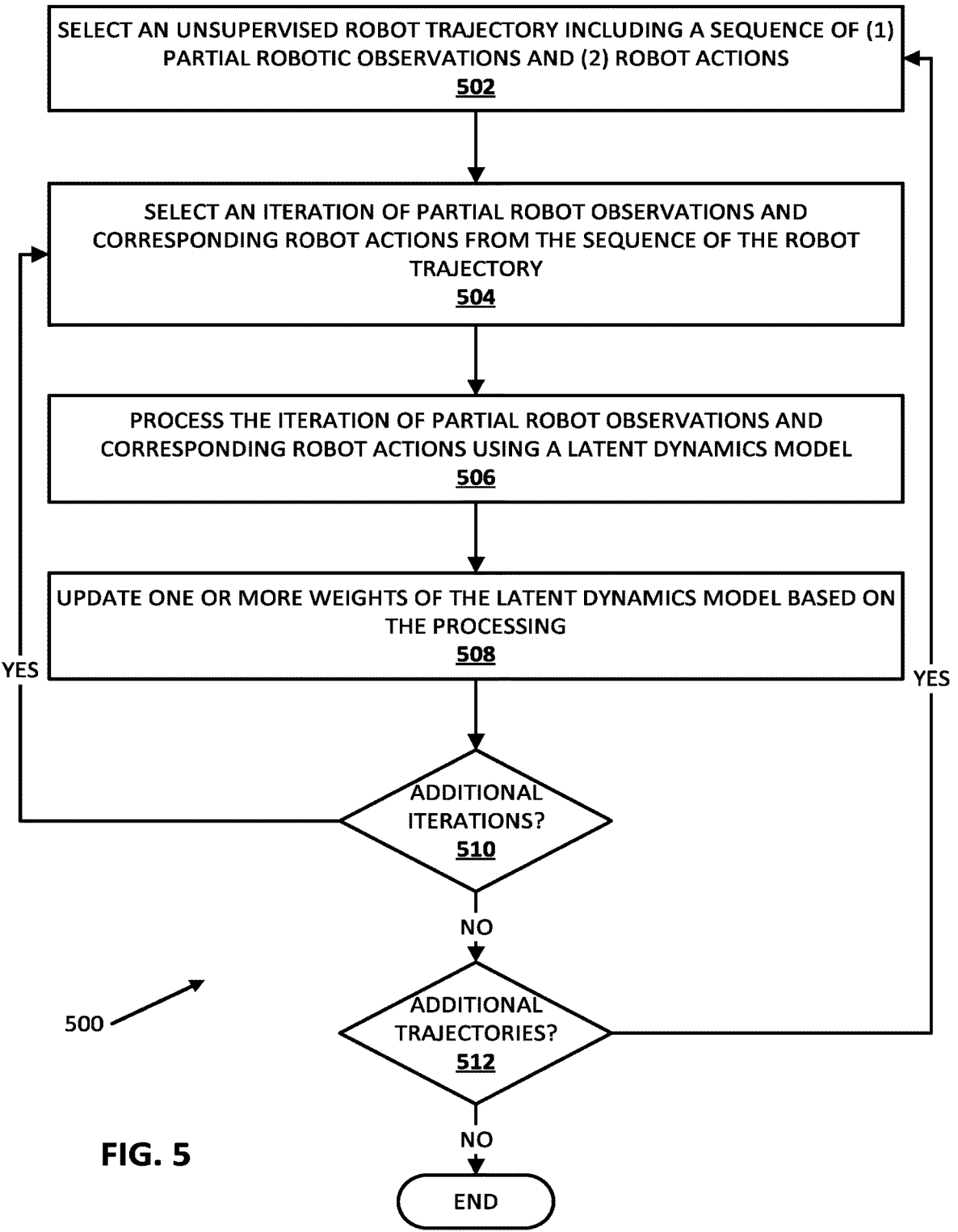
FIG. 5 is a flowchart illustrating an example process of training a latent dynamics model in accordance with various implementations disclosed herein.

FIG. 5 is a flowchart illustrating an example process 500 of training a latent dynamics model according to implementations disclosed herein. For convenience, the operations of the flowchart are described with reference to a system that performs the operations. This system may include various components of various computer systems, such as one or more components of robot 102 of FIG. 1. Moreover, while operations of process 500 are shown in a particular order, this is not meant to be limiting. One or more operations may be reordered, omitted, and/or added.

At block 502, the system selects an unsupervised robot trajectory including a sequence of (1) partial robotic observations and (2) robot actions. In many implementations, unsupervised robot trajectories can include a sequence of images, such as a sequence of images of a robot maneuvering within an environment. Additionally or alternatively, the images of the robot can be pixel based images. In a variety of implementations, partial robotic observations can be determined from individual images such as including positions, but not velocities of one or more robot components. Furthermore, in many implementations, the task a robot is performing in the robot trajectory sequences is an unknown task. For example, unsupervised trajectories $D_u = \{\{o_t^n, a_t^n\}_{t=1}^T\}_{n=1}^{N_u}$ of partial observations $o_t$ and partial actions $a_t$ can be utilized in training the latent dynamics model.

At block 504, the system selects an iteration of partial robot observations and corresponding robot actions from the sequence of the robot trajectory. For example, the system can select an image at a time step N from a video sequence of the robot.

At block 506, the system processes the iteration of partial robot observations and corresponding robot actions using a latent dynamics model. For example, the system can process the iteration utilizing the encoder network, the transition function, the posterior function, and/or the decoder network of the latent dynamics model.

At block 508, the system updates one or more weights of the latent dynamics model based on the processing at block 506.

At block 510 the system determines whether there are additional iterations of the robot trajectory. For example, the system can determine whether there are additional iterations in the sequence of the robot trajectory. If so, the system proceeds back to block 504 and selects an additional iteration of the unsupervised robot trajectory before proceeding to blocks 506 and 508. If not, the system proceeds to block 512.

At block 512, the system determines whether to train the model with additional trajectories. For example, the system can determine whether all unsupervised robot trajectories have been utilized in training the model, whether a threshold value of training has been reached, and/or whether additional training end condition(s) have been reached. If the system determines to train the model with one or more additional unsupervised robot trajectories, the system proceeds back to block 502 to select an additional unsupervised robot trajectory before proceeding to blocks 504, 506, and 508. If the system determines not to train the model with additional unsupervised robot trajectories, the process ends.

Figure 6:
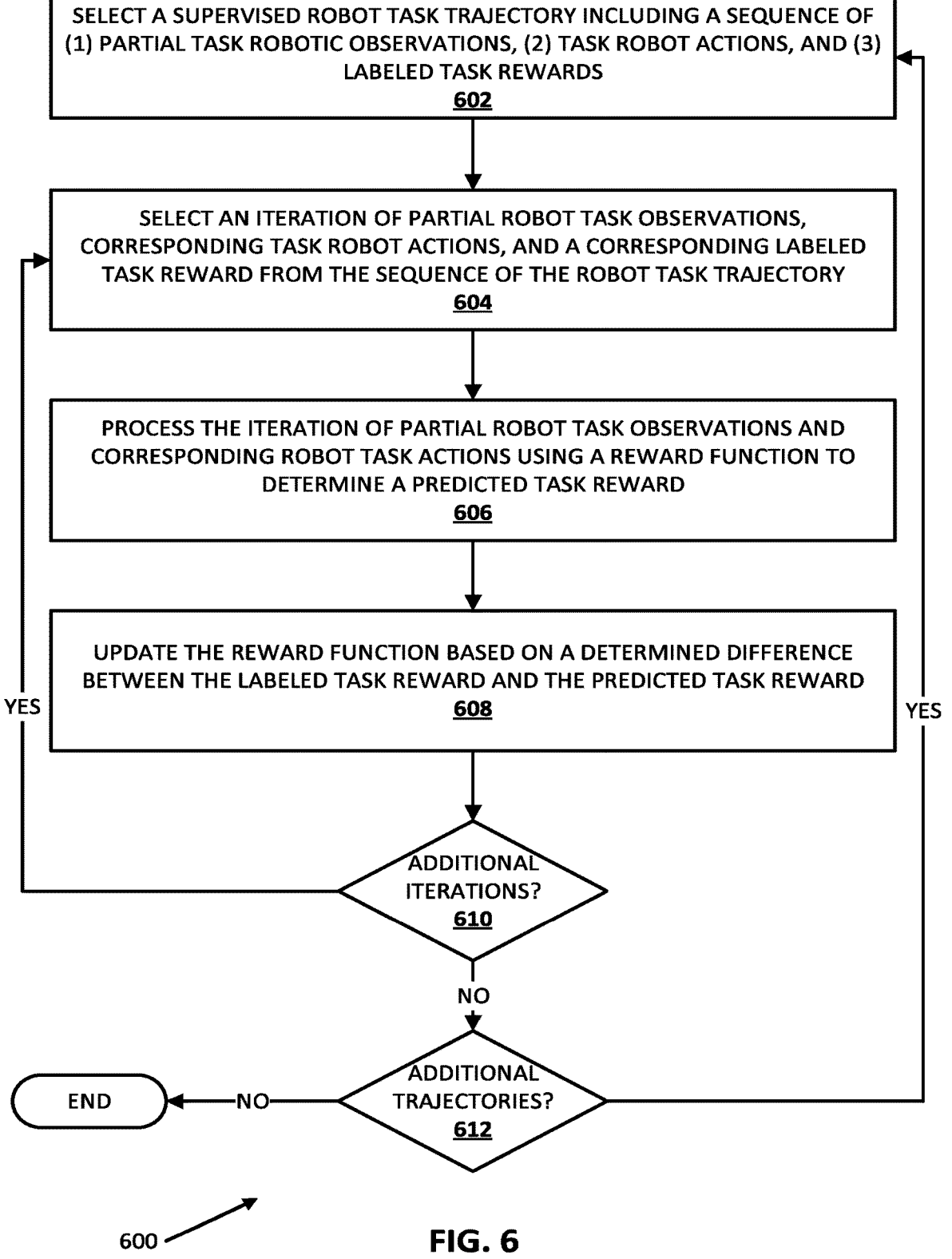
FIG. 6 is a flowchart illustrating an example process of training a reward function for a robotic task in accordance with various implementations disclosed herein.

FIG. 6 is a flowchart illustrating an example process 600 of training a reward function for a robot task according to implementations disclosed herein. For convenience, the operations of the flowchart are described with reference to a system that performs the operations. This system may include various components of various computer systems, such as one or more components of robot 102 of FIG. 1. Moreover, while operations of process 600 are shown in a particular order, this is not meant to be limiting. One or more operations may be reordered, omitted, and/or added.

At block 602, the system selects a supervised robot task trajectory including a sequence of (1) partial task robotic observations, (2) task robot actions, and (3) labeled task rewards. In many implementations, a smaller number of robot task trajectories can be utilized in training a robot reward function compared to a larger number of unsupervised robot trajectories utilized in training the corresponding latent dynamics model. For example, a reward predictor for every task $t$ can use a small data set $D_\tau = \{\{o_t^n, a_t^n, r_t^n\}_{t=1}^{T_n}\}_{n=1}^{N_u}$ that includes reward $r_t$. In contrast to value functions, reward functions can be simple functions of the environment state. If the learned latent space recovers the relevant information about the true state of the robot, the reward function can be learned using a few examples. Using the learned model and the reward function, a model-predictive controller in latent space can be utilized to plan for the best actions according to the learned transition and reward functions.

At block 604, the system selects an iteration of partial robot task observations, corresponding task robot actions, and a corresponding labeled task reward from the sequence of the robot task trajectory. For example, the system can select a first image of a robot performing the task of walking backwards.

At block 606, the system processes the iteration of partial robot task observations and corresponding robot task actions using a reward function to determine a predicted task reward.

At block 608, the system updates the reward function based on a determined difference between the labeled task reward and the predicted task reward.

At block 610, the system determines whether to process any additional iterations of the supervised robot task trajectory. For example, the system can determine whether there are any additional iterations of the supervised robot task trajectory remaining. If so, the system can proceed back to block 604 and select an additional iteration of the robot task observation before proceeding to blocks 606 and 608. If not, the system can proceed to block 612.

At block 612, the system determines whether to process any additional supervised robot task trajectories. For example, the system can determine whether all robot task trajectories have been utilized in training the model, whether a threshold value of training has been reached, and/or whether additional training end condition(s) have been reached. If the system determines to train the reward function with one or more additional robot task trajectories, the system proceeds back to block 602 to select an additional robot task trajectory before proceeding to blocks 604, 606, and 608. If the system determines not to train the model with additional unsupervised robot trajectories, the process ends.

Figure 7:
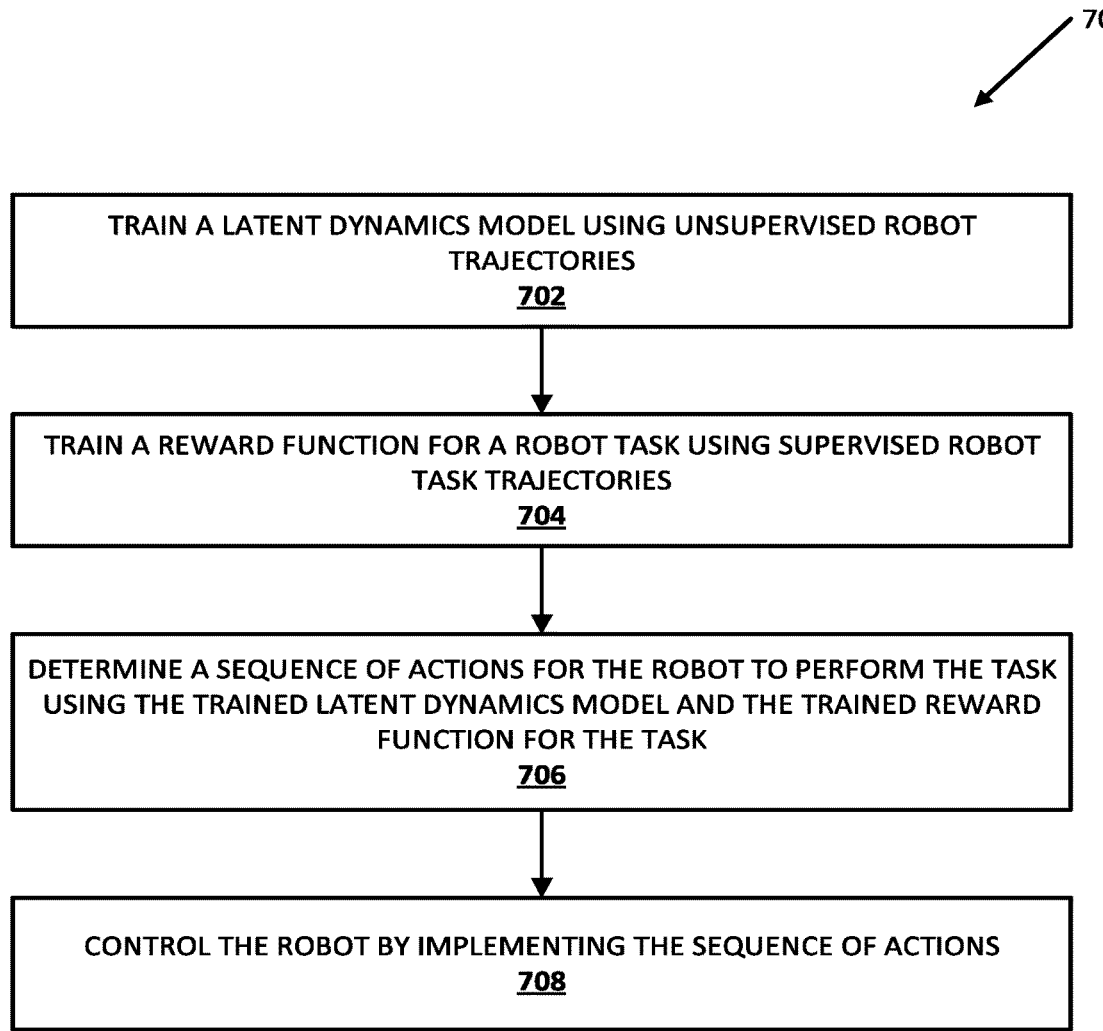
FIG. 7 is a flowchart illustrating an example process of controlling a robot to perform a task using a latent dynamics model and a trained reward task function in accordance with various implementations disclosed herein.

FIG. 7 is a flowchart illustrating an example process 700 of controlling a robot using model predictive control according to implementations disclosed herein. For convenience, the operations of the flowchart are described with reference to a system that performs the operations. This system may include various components of various computer systems, such as one or more components of robot 102 of FIG. 1. Moreover, while operations of process 700 are shown in a particular order, this is not meant to be limiting. One or more operations may be reordered, omitted, and/or added.

At block 702, the system trains a latent dynamics model using unsupervised robot trajectories. In many implementations, the latent dynamics model can be a deterministic belief state space model. Training a latent dynamics model in accordance with many implementations is described in FIG. 5.

At block 704, the system trains a reward function for a robot task using supervised robot task trajectories. In many implementations, a separate reward function can be trained for each robot task. For example, a robot trained to perform 10 tasks can utilize 10 distinct reward functions. Training a reward function in accordance with many implementations is described in FIG. 6.

At block 706, the system determines a sequence of actions for the robot to perform the task using the trained latent dynamics model and the trained reward function for the task. For example, the system can use the latent dynamics model and the reward function to predict the position of the robot at each time step in the next N time steps. These predicted positions can be utilized in model predictive control to determine one or more control signals to change the position of the robot.

At block 708, the system controls the robot by implementing the sequence of actions. For example, one or more motors of the robot can be actuated in accordance with the predicted position of the robot at future time steps.

Figure 8:
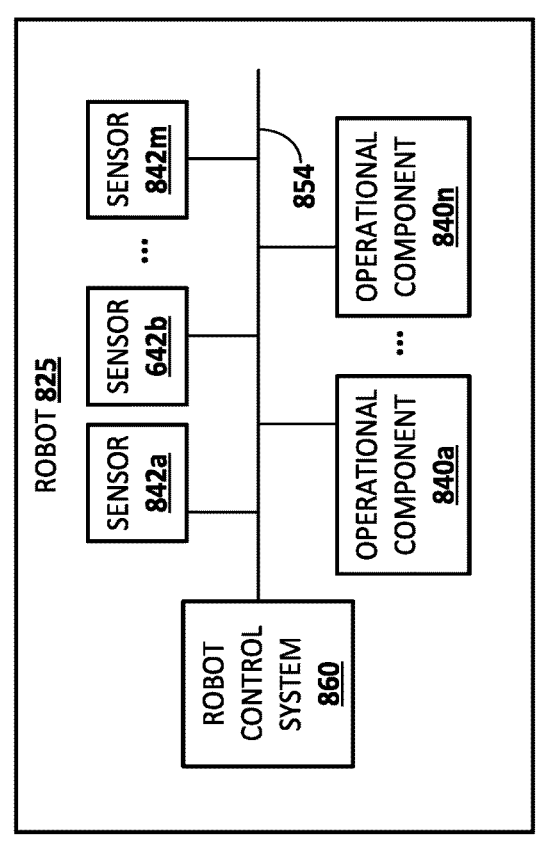
FIG. 8 illustrates an example architecture of a robot.

FIG. 8 schematically depicts an example architecture of a robot 825. The robot 825 includes a robot control system 860, one or more operational components 825a-825n, and one or more sensors 842a-842m. The sensors 842a-842m may include, for example, vision sensors, light sensors, pressure sensors, pressure wave sensors (e.g., microphones), proximity sensors, accelerometers, gyroscopes, thermometers, barometers, and so forth. While sensors 842a-m are depicted as being integral with robot 825, this is not meant to be limiting. In some implementations, sensors 842a-m may be located external to robot 825, e.g., as standalone units.

Operational components 840a-840n may include, for example, one or more end effectors and/or one or more servo motors or other actuators to effectuate movement of one or more components of the robot. For example, the robot 825 may have multiple degrees of freedom and each of the actuators may control actuation of the robot 825 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 860 may be implemented in one or more processors, such as a CPU, GPU, and/or other controller(s) of the robot 825. In some implementations, the robot 825 may comprise a "brain box" that may include all or aspects of the control system 860. For example, the brain box may provide real time bursts of data to the operational components 840a-n, with each of the real time bursts comprising a set of one or more control commands that dictate, inter alia, the parameters of motion (if any) for each of one or more of the operational components 840*a*-*n*. In some implementations, the robot control system 860 may perform one or more aspects of processes 500, 600, and/or 700 described herein. As described herein, in some implementations all or aspects of the control commands generated by control system 860 can position limb(s) of robot 825 for robotic locomotion tasks. Although control system 860 is illustrated in FIG. 8 as an integral part of robot 825, in some implementations, all or aspects of the control system 860 may be implemented in a component that is separate from, but in communication with robot 825. For example, all or aspects of control system 860 may be implemented on one or more computing devices that are in wired and/or wireless communication with the robot 825, such as computing device 910.

Figure 9:
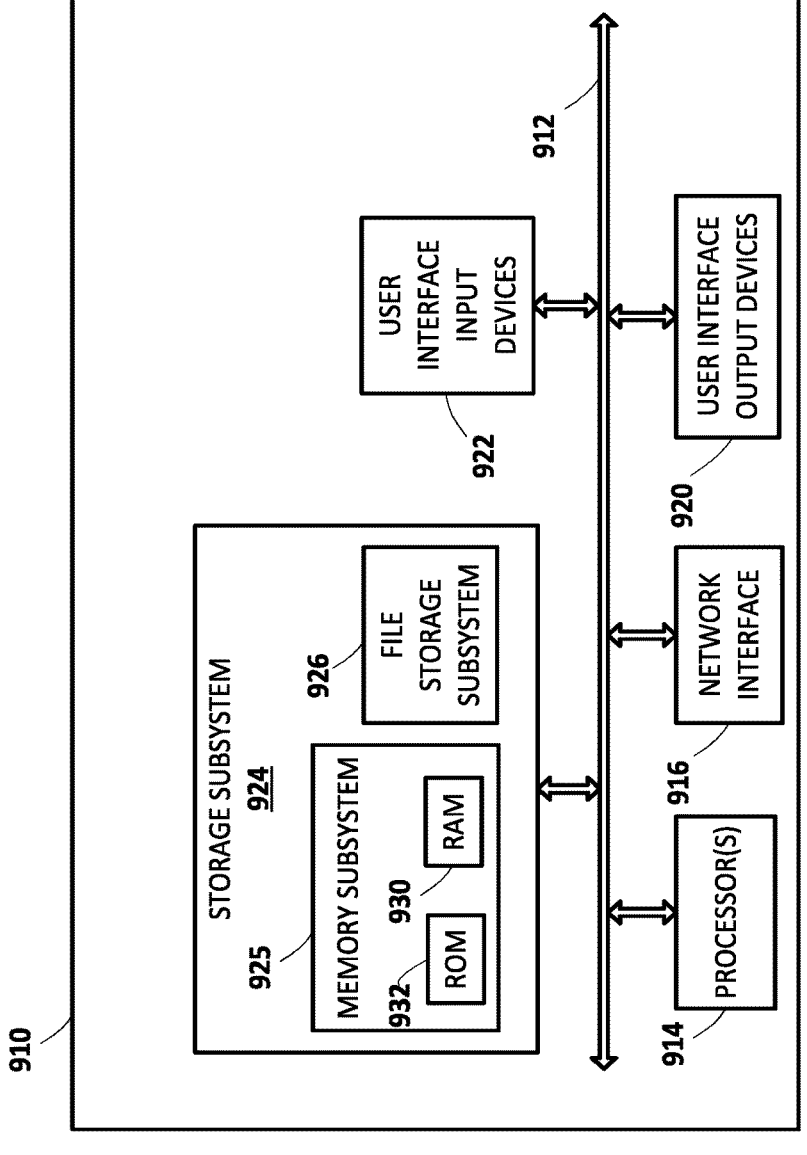
FIG. 9 illustrates an example architecture of a computing device.

FIG. 9 is a block diagram of an example computing device 910 that may optionally be utilized to perform one or more aspects of techniques described herein. For example, in some implementations computing device 910 may be utilized to provide desired locomotion by robot 825 and/or other robots. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the process of FIGS. 5, 6, and/or 7.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method is provided that includes training a latent robot dynamics model using unsupervised robot trajectories. Each of the unsupervised robot trajectories includes a corresponding sequence of: partial robotic observations, where each of the partial robotic observations corresponds to a time step of the sequence, and robotic actions, where each of the robotic actions corresponds to time step of the sequence. The method further includes identifying supervised robot task trajectories for a robot task Each of the supervised robot task trajectories includes a corresponding sequence of: partial task robotic observations during a corresponding performance of the robot task, task robotic actions during the corresponding performance of the robot task, and labeled task rewards for the corresponding performance of the robot task. The method further includes training a reward function for the robot task using the supervised robot task trajectories. The method further includes controlling a robot to perform the robot task, where controlling the robot to perform the robot task includes: determining a sequence of actions for the robot using both the trained robot latent dynamics model and the trained reward function for the robot task; and controlling the robot by implementing the sequence of actions.

These and other implementations of the technology may include one or more of the following features.

In some implementations, the partial robotic observations of the unsupervised robot trajectories, and the partial task robotic observations of the supervised robot task trajectories, may each be a corresponding image that captures a corresponding robot.

In some of those implementations, the latent robot dynamics model may be a deterministic belief state model (DBSM). In some of those implementations, the DBSM may include an encoder network, a transition function, a posterior function, and a decoder network. In some of those implementations, training the DBSM may include training the transition function using latent overshooting. In some of those implementations, the latent overshooting may include performing a fixed number of open-loop predictions from a corresponding posterior at every time step. In some of those implementations, the latent overshooting may further include determining a Kullback-Leibler divergence between the open-loop predictions and the corresponding posterior. In some of these implementations, training the DBSM may further include training the encoder network to deterministically update a deterministic activation vector at every time step.

In these implementations, determining a sequence of actions for the robot using both the trained robot latent dynamics model and the trained reward function for the robot task may include using model predictive control in view of the trained robot latent dynamics model and the trained reward function. In some of those implementations, training the reward function may further include training the reward function based on a first quantity of the supervised robot task trajectories. In some of these implementations, the first quantity may be less than a second quantity of the unsupervised robot trajectories on which the latent robot dynamics model is trained.

In some of those implementations, the first quantity may be less than one percent of the second quantity. In some of those implementations, the first quantity may be less than fifty. In some of these implementations, the first quantity may be less than twenty-five.

In some these implementations, the method may further include identifying second supervised robot task trajectories for a second robot task. Each of the second supervised robot task trajectories includes a corresponding sequence of: second partial task robotic observations during a corresponding performance of the second robot task, second task robotic actions during the corresponding performance of the second robot task, and second labeled task rewards for the corresponding performance of the second robot task. In some of these implementations the method may further include training a second reward function for the second robot task using the supervised robot task trajectories. In some of these implementations the method may further include controlling a robot to perform the second robot task where controlling the robot to perform the second robot task may include: determining a second sequence of actions for the robot using both the trained robot latent dynamics model and the trained second reward function for the second robot task, and controlling the robot by implementing the second sequence of actions.

In some implementations, a method is provided that includes identifying unsupervised robot trajectories. Each of the unsupervised robot trajectories includes: observation images, where each of the observation images captures a corresponding robot and is for a corresponding time step of the sequence, and robotic actions, where each of the robotic actions is for a corresponding time step of the sequence. The method further includes training a latent robot dynamics model using the unsupervised robot trajectories. The method further includes using the trained latent robot dynamics model in latent planning for one or more robotic control tasks through generation, at each of a plurality of time steps, and using the trained robot dynamics model, of a corresponding deterministic activation vector.

These and other implementations of the technology may include one or more of the following features.

In some implementations, the latent robot dynamic model may include an encoder network, a transition function, a posterior function, and a decoder network. In these implementations, training the latent robot dynamics model may include training the transition function using latent overshooting. In these implementations, the latent overshooting may include performing a fixed number of open-loop predictions from a corresponding posterior at every time step. In these implementations, the latent overshooting may further include determining a Kullback-Leibler divergence between the open-loop predictions and the corresponding posterior.

In those implementations, training the DBSM may include training the encoder network to deterministically update the deterministic activation vector at every time step. In those implementations, a plurality of the unsupervised robot trajectories may be generated in a simulated environment.

In some implementations, a robot is provided that includes one or more actuators, memory storing a trained latent robot dynamics model and a trained reward function for a robot task, and one or more processors. The one or more processors are configured to: use one or more latent state observations of the robot, the latent robot dynamics model, and the trained reward function, to determine a sequence of actions for performing the robot task. The one or more processors are further configured to control one or more of the actuators based on the determined sequence of actions to cause performance of the robot task.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

The invention claimed is:

1. A robot comprising:
   one or more actuators;
   memory storing a trained latent robot dynamics model and a trained reward function for a robot task;
   one or more processors configured to:

predict multiple candidate sequences of actions using a latent state observation of the robot and the latent robot dynamics model;

select, from the multiple candidate sequences of actions, using the trained reward function, a sequence of actions for performing the robot task; and control one or more actuators based on the selected sequence of actions to cause performance of the robot task.

2. The robot of claim 1, wherein the latent robot dynamics model is a deterministic belief state model (DBSM).

3. The robot of claim 2, wherein the DBSM includes an encoder network and a decoder network.

4. The robot of claim 3, wherein the encoder network is used in deterministically updating a deterministic activation vector based on processing the latent state observation of the robot, and one or more historical latent state observations of the robot.

5. The robot of claim 4, wherein the DBSM further includes a transition function and wherein the transition function is used to generate one or more future states of the robot based on the latent state observation and the sequence of actions for performing the robot task.

6. The robot of claim 5, wherein the decoder network is used to generate the sequence of actions for performing the robot task based on the latent state observation of the robot, the one or more historical latent state observations of the robot, and the one or more future states of the robot.

7. A robot comprising:

one or more actuators;

memory storing a trained latent robot dynamics model and a trained reward function for a robot task;

one or more processors configured to:

use a latent state observation of the robot, the latent robot dynamics model, and the trained reward function, to determine a sequence of actions for performing the robot task; and control one or more actuators based on the determined sequence of actions to cause performance of the robot task;

wherein, subsequent to controlling the one or more actuators based on the determined sequence of actions to cause performance of the robot task, one or more of the processors are further configured to:

identify an updated latent state observation of the robot;

use the updated latent state observation of the robot, the latent robot dynamics model, and the trained reward function, to determine an updated sequence of actions for performing the robot task; and control the one or more actuators based on the determined updated sequence of actions to cause performance of the robot task.

8. A robot comprising:

one or more actuators;

memory storing a trained latent robot dynamics model and a trained reward function for a robot task;

one or more processors configured to:

use a latent state observation of the robot, the latent robot dynamics model, and the trained reward function, to determine a sequence of actions for performing the robot task; and control one or more actuators based on the determined sequence of actions to cause performance of the robot task;

wherein, subsequent to controlling the one or more actuators based on the determined sequence of actions to cause performance of the robot task, one or more of the processors are further configured to:

use an additional latent state observation of the robot, the latent robot dynamics model, and the trained reward function, to determine an additional sequence of actions for performing an additional robot task; and control the one or more actuators based on the additional sequence of actions to cause performance of the additional robot task.

9. A method implemented by one or more processors, the method comprising:

predicting multiple candidate sequences of actions using a latent state observation of a robot and a latent robot dynamics model;

selecting, from the multiple candidate sequences of actions, using a trained reward function a sequence of actions for performing a robot task, wherein the trained reward function is for the robot task; and controlling one or more actuators based on the selected sequence of actions to cause performance of the robot task.

10. The method of claim 9, wherein the latent robot dynamics model is a deterministic belief state model (DBSM).

11. The method of claim 10, wherein the DBSM includes an encoder network and a decoder network.

12. The method of claim 11, wherein the encoder network is used in deterministically updating a deterministic activation vector based on processing the latent state observation of the robot, and one or more historical latent state observations of the robot.

13. The method of claim 12, wherein the DBSM further includes a transition function and wherein the transition function is used to generate one or more future states of the robot based on the latent state observation and the sequence of actions for performing the robot task.

14. The method of claim 13, wherein the decoder network is used to generate the sequence of actions for performing the robot task based on the latent state observation of the robot, the one or more historical latent state observations of the robot, and the one or more future states of the robot.

15. A method implemented by one or more processors, the method comprising:

using a latent state observation of a robot, a latent robot dynamics model, and a trained reward function, to determine a sequence of actions for performing a robot task, wherein the trained reward function is for the robot task; and controlling one or more actuators based on the determined sequence of actions to cause performance of the robot task;

wherein, subsequent to controlling the one or more actuators based on the determined sequence of actions to cause performance of the robot task, the method further comprises:

identifying an updated latent state observation of the robot;

using the updated latent state observation of the robot, the latent robot dynamics model, and the trained reward function, to determine an updated sequence of actions for performing the robot task; and controlling the one or more actuators based on the determined updated sequence of actions to cause performance of the robot task.

16. A method implemented by one or more processors, the method comprising:

using a latent state observation of a robot, a latent robot dynamics model, and a trained reward function, to determine a sequence of actions for performing a robot task, wherein the trained reward function is for the robot task; and controlling one or more actuators based on the determined sequence of actions to cause performance of the robot task;

wherein, subsequent to controlling the one or more actuators based on the determined sequence of actions to cause performance of the robot task, the method further comprises:

using an additional latent state observation of the robot, the latent robot dynamics model, and the trained reward function, to determine an additional sequence of actions for performing an additional robot task; and controlling the one or more actuators based on the additional sequence of actions to cause performance of the additional robot task.

\* \* \* \* \*